United States Patent
Peng et al.

(10) Patent No.: US 10,593,073 B2
(45) Date of Patent: *Mar. 17, 2020

(54) SYSTEM AND METHOD FOR REMOVING HARD TISSUE IN CT IMAGE

(71) Applicant: SHANGHAI UNITED IMAGING HEALTHCARE CO., LTD., Shanghai (CN)

(72) Inventors: Hailing Peng, Shanghai (CN); Dajun Wang, Shanghai (CN); Weiqiang Guo, Shanghai (CN)

(73) Assignee: SHENZHEN UNITED IMAGING HEALTHCARE CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,664

(22) Filed: Apr. 3, 2019

(65) Prior Publication Data

US 2019/0228549 A1 Jul. 25, 2019

Related U.S. Application Data

(63) Continuation of application No. 15/798,246, filed on Oct. 30, 2017, now Pat. No. 10,255,698, which is a
(Continued)

(51) Int. Cl.
*G06T 11/00* (2006.01)
*G06T 5/00* (2006.01)
(Continued)

(52) U.S. Cl.
CPC .......... *G06T 11/008* (2013.01); *G06T 5/005* (2013.01); *G06T 5/50* (2013.01); *G06T 7/30* (2017.01);
(Continued)

(58) Field of Classification Search
CPC .......... G06T 11/008; G06T 7/30; G06T 5/005; G06T 5/50; G06T 2207/10081; G06T 2207/30008; G06T 2211/421
(Continued)

(56) References Cited

U.S. PATENT DOCUMENTS 6,845,142 B2 * 1/2005 Ohishi .................. A61B 6/481
378/4
7,134,787 B2 * 11/2006 Sun ...................... A61B 6/4035
378/207
(Continued)

FOREIGN PATENT DOCUMENTS

CN 103186883 A 7/2013
CN 103186883 B 9/2015
(Continued)

OTHER PUBLICATIONS

International Search Report in PCT/CN2017/099353 dated May 25, 2018, 5 pages.
(Continued)

*Primary Examiner* — Jonathan S Lee
(74) *Attorney, Agent, or Firm* — Metis IP LLC

(57) ABSTRACT

A system and method for CT image reconstruction are provided. The method may include: obtaining raw data set related to an object; generating a first image set based on the raw data set, wherein the first image set includes a first full quality image and a first max field of view image; generating one or more reference images based on the first max field of view image; generating a first bone information image based on the one or more reference images; generating a second image set based on the raw data set, wherein the second image set includes a second full quality image; generating a second bone information image based on the one or more reference images; correcting hardening beam artifact of the second full quality image based on the second bone infor-
(Continued)

mation image to generate a hardening beam artifact corrected image.

20 Claims, 9 Drawing Sheets

Related U.S. Application Data continuation of application No. PCT/CN2017/099353, filed on Aug. 28, 2017.

(51) Int. Cl.
 G06T 5/50 (2006.01)
 G06T 7/30 (2017.01)
(52) U.S. Cl.
 CPC ........... G06T 2207/10081 (2013.01); G06T 2207/30008 (2013.01); G06T 2211/408 (2013.01); G06T 2211/421 (2013.01)
(58) Field of Classification Search
 USPC ........................................................ 382/131
 See application file for complete search history.

(56) References Cited

U.S. PATENT DOCUMENTS

| | | | |
|---|---|---|---|
| 7,149,277 B2* | 12/2006 | Tanigawa | A61B 6/032 378/18 |
| 7,298,812 B2* | 11/2007 | Tkaczyk | A61B 6/032 378/4 |
| 7,724,935 B2* | 5/2010 | Van Stevendaal | G06T 11/005 382/100 |
| 8,279,996 B2* | 10/2012 | Allmendinger | A61B 6/032 378/4 |
| 2008/0107231 A1 | 5/2008 | Miyazaki et al. | |
| 2014/0198892 A1 | 7/2014 | Yamakawa et al. | |
| 2014/0270439 A1 | 9/2014 | Chen | |
| 2015/0125055 A1 | 5/2015 | Gao et al. | |
| 2016/0134852 A1 | 5/2016 | Gao et al. | |
| 2017/0091932 A1 | 3/2017 | Cao et al. | |
| 2017/0228897 A1 | 8/2017 | Holt et al. | |
| 2019/0066345 A1 | 2/2019 | Peng et al. | |

FOREIGN PATENT DOCUMENTS

| | | |
|---|---|---|
| JP | H05192325 A | 8/1993 |
| JP | H07275236 A | 10/1995 |
| JP | 2012050853 A | 3/2012 |

OTHER PUBLICATIONS

Written Opinion in PCT/CN2017/099353 dated May 25, 2018, 4 pages.

Jin, Pengchong et al., A Model-Based Image Reconstruction Algorithm With Sirnuitaneous Beam Hardening Correction for X-Ray CT, IEEE Transactions on Computational Imaging, 1(3): 200-216, 2015.

Ketcham, Richard A. et al., Beam hardening correction for X-ray computed tomography of heterogeneous natural materials, Computers & Geosciences, 67: 49-61, 2014.

* cited by examiner

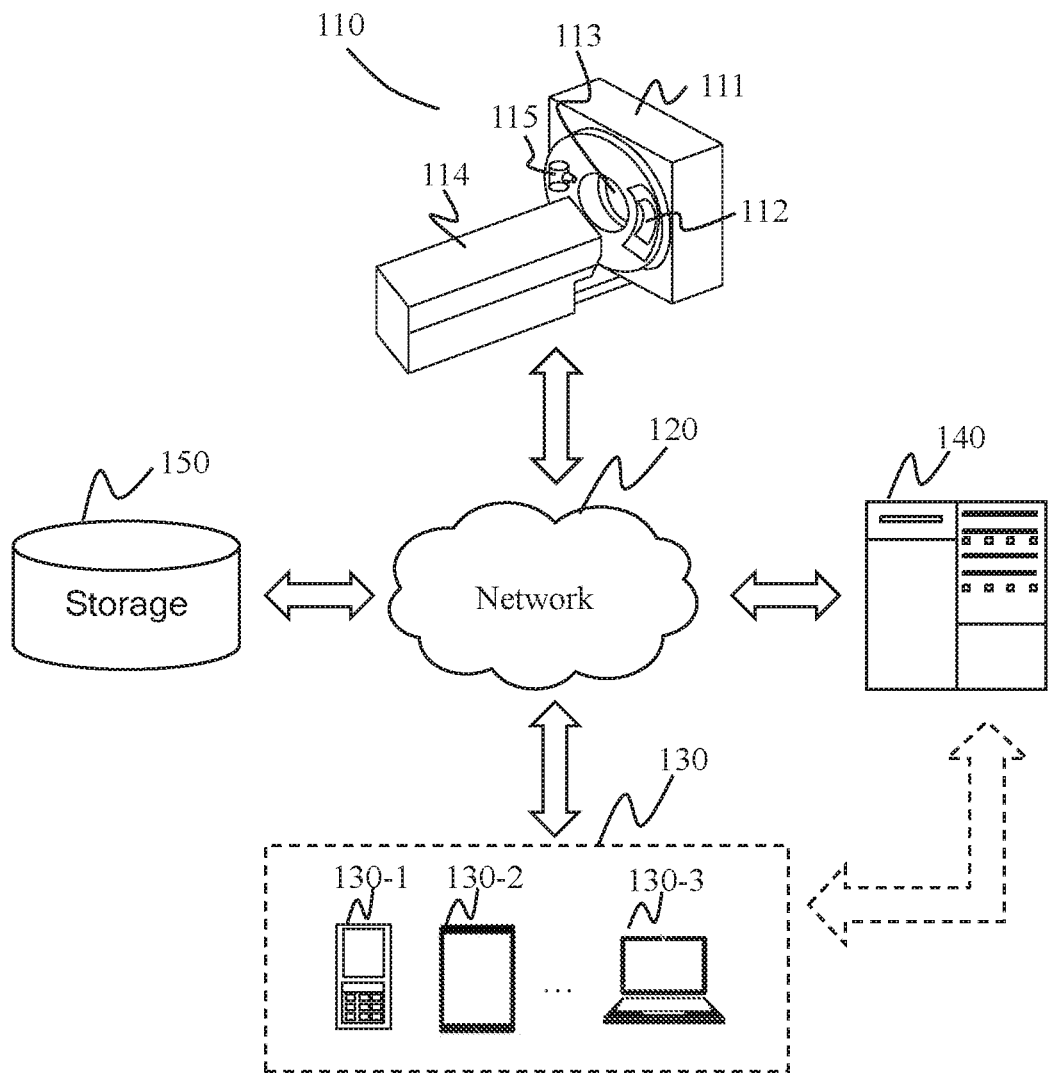
FIG. 1-A

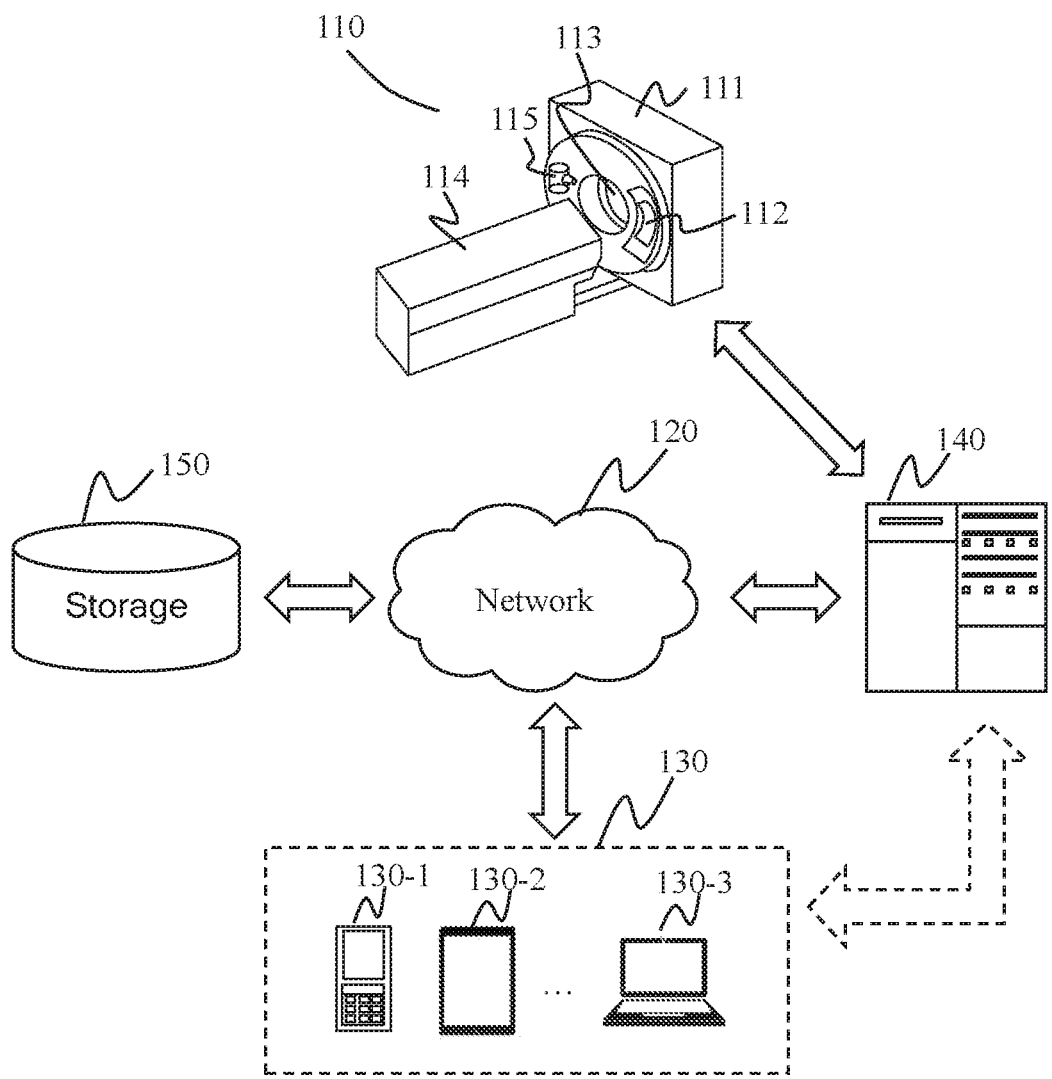
FIG. 1-B

SYSTEM AND METHOD FOR REMOVING HARD TISSUE IN CT IMAGE

CROSS-REFERENCE TO RELATED APPLICATIONS

This application is a continuation of U.S. application Ser. No. 15/798,246 filed on Oct. 30, 2017, which is a continuation of International Application No. PCT/CN2017/099353 filed on Aug. 28, 2017, the entire contents of each of which are hereby incorporated by reference.

TECHNICAL FIELD

The present disclosure generally relates to computed tomography (CT), and more specifically relates to a system and method for correcting artifact due to hard tissue in CT image.

BACKGROUND

To provide a clear view of soft tissue, hard tissue sometimes needs to be removed from a CT image. However, the traditional way for hard tissue removal and hardening beam artifact correction consumes much time when two or more different CT images having different reconstruction parameters need to be generated and corrected. The present disclosure provides an efficient method and system for correcting artifact due to hard tissue in a CT image.

SUMMARY

In a first aspect of the present disclosure, a system for CT image reconstruction is provided. The system may include at least one processor and instructions. When the at least one processor executes the instructions, the at least one processor may be directed to perform one or more of the following operations. The at least one processor may obtain a raw data set related to an object. The at least one processor may generate a first image set based on the raw data set, wherein the first image set may include a first full quality image and a first max field of view image. The at least one processor may generate one or more reference images based on the first max field of view image. The at least one processor may generate a first bone information image based on the one or more reference images. The at least one processor may generate a second image set based on the raw data set, wherein the second image set includes a second full quality image. The at least one processor may generate a second bone information image based on the one or more reference images. The at least one processor may correct hardening beam artifact of the second full quality image based on the second bone information image to generate a hardening beam artifact corrected image.

In some embodiments, a first image thickness of the first bone information image may be greater than an image thickness of the reference image, a second image thickness of the second bone information image may be greater than the image thickness of the reference image, and the first image thickness may be different from the second image thickness.

In some embodiments, a first image increment of the first bone information image may be greater than an image increment of the reference image, a second image increment of the second bone information image may be greater than the image increment of the reference image, and the first image increment may be different from the second image increment.

In some embodiments, a field of view of the first full quality image may be smaller than a field of view of the first max field of view image.

In some embodiments, the at least one processor may remove hard tissue from the first full quality image based on the first max field of view image to generate a hard tissue corrected image.

In some embodiments, to generate the first bone information image, the at least one processor may stack one or more reference images based on an image thickness of the first bone information image and an image thickness of the reference image.

In some embodiments, to generate the second bone information image, the at least one processor may stack one or more reference images based on an image thickness of the second bone information image and an image thickness of the reference image.

In some embodiments, an image thickness of the first full quality image and an image thickness of the second full quality image may be different.

In some embodiments, an image increment of the first full quality image and an image increment of the second full quality image may be different.

In some embodiments, the at least one processor may output the first bone information image or the second bone information image to a user.

In a second aspect of the present disclosure, a method for CT image reconstruction is provided. The method may include one or more of the following operations. A raw data set related to an object may be obtained. A first image set may be generated based on the raw data set, wherein the first image set includes a first full quality image and a first max field of view image. One or more reference images based on the first max field of view image may be generated. A first bone information image based on the one or more reference images may be generated by a processor. A second image set may be generated based on the raw data set, wherein the second image set includes a second full quality image. A second bone information image may be generated based on the one or more reference images. Hardening beam artifact of the second full quality image may be corrected based on the second bone information image to generate a hardening beam artifact corrected image.

In some embodiments, a first image thickness of the first bone information image may be greater than an image thickness of the reference image, a second image thickness of the second bone information image may be greater than the image thickness of the reference image, and the first image thickness may be different from the second image thickness.

In some embodiments, a first image increment of the first bone information image may be greater than an image increment of the reference image, a second image increment of the second bone information image may be greater than the image increment of the reference image, and the first image increment may be different from the second image increment.

In some embodiments, a field of view of the first full quality image may be smaller than a field of view of the first max field of view image.

In some embodiments, hard tissue from the first full quality image may be removed based on the first max field of view image to generate a hard tissue corrected image.

In some embodiments, to generate the first bone information image, one or more reference images may be stacked based on an image thickness of the first bone information image and an image thickness of the reference image.

In some embodiments, to generate the second bone information image, one or more reference images may be stacked based on an image thickness of the second bone information image and an image thickness of the reference image.

In some embodiments, an image thickness of the first full quality image and an image thickness of the second full quality image may be different.

In some embodiments, an image increment of the first full quality image and an image increment of the second full quality image may be different.

In a third aspect of the present disclosure, a non-transitory computer readable medium is provided. The non-transitory computer readable medium may include executable instructions. When at least one processor executes the instructions, the at least one processor may effectuate a method including one or more of the following operations. A raw data set related to an object may be obtained. A first image set may be generated based on the raw data set, wherein the first image set includes a first full quality image and a first max field of view image. One or more reference images based on the first max field of view image may be generated. A first bone information image based on the one or more reference images may be generated by a processor. A second image set may be generated based on the raw data set, wherein the second image set includes a second full quality image. A second bone information image may be generated based on the one or more reference images. Hardening beam artifact of the second full quality image may be corrected based on the second bone information image to generate a hardening beam artifact corrected image.

In a fourth aspect of the present disclosure, a method for CT image reconstruction is provided. The method may include one or more of the following operations. A raw data set related to an object may be obtained. A set of full quality images with a target image thickness may be generated based on the raw data set. A set of original bone information images with an original image thickness may be generated based on the raw data set. A set of target bone information images with a target image thickness may be generated based on the set of original bone information images. A set of hardening beam artifact corrected images may be generated by correcting hardening beam artifact of the full quality images based on the set of target bone information images to generate.

In some embodiments, the target image thickness may be greater than the original image thickness.

In some embodiments, to generate a set of original bone information images, a set of max field of view images may be generated based on the raw data set, and a set of original bone information images may be generated based on the max field of view images.

In some embodiments, hard tissue from the set of full quality images may be removed based on the set of target bone information images to generate a set of hard tissue corrected images.

In a fifth aspect of the present disclosure, a system for CT image reconstruction is provided. The system may include a data acquisition unit, an image reconstruction unit, a correction image generation unit and a correction unit. The data acquisition unit may be configured to obtain a raw data set related to an object. The image reconstruction unit may be configured to generate a first image set based on the raw data set, wherein the first image set includes a first full quality image and a first max field of view image, and generate a second image set including a second full quality image. The correction image generation unit may be configured to generate one or more reference images based on the first max field of view image, and generate a first bone information image and a second bone information image based on the one or more reference images. The correction unit may be configured to correct hardening beam artifact of the second full quality image based on the second bone information image to generate a hardening beam artifact corrected image.

In some embodiments, a first image thickness of the first bone information image may be greater than an image thickness of the reference image, a second image thickness of the second bone information image may be greater than the image thickness of the reference image, and the first image thickness is different from the second image thickness.

In some embodiments, a first image increment of the first bone information image may be greater than an image increment of the reference image, a second image increment of the second bone information image is greater than the image increment of the reference image, and the first image increment is different from the second image increment.

In some embodiments, a field of view of the first full quality image may be smaller than a field of view of the first max field of view image.

In some embodiments, the correction unit may be further configured to remove hard tissue from the first full quality image based on the first max field of view image to generate a hard tissue corrected image.

In some embodiments, to generate the first bone information image, the correction image generation unit may be further configured to stack one or more reference images based on an image thickness of the first bone information image and an image thickness of the reference image.

In some embodiments, to generate the second bone information image, the correction image generation unit may be further configured to stack one or more reference images based on an image thickness of the second bone information image and an image thickness of the reference image.

In some embodiments, the correction image generation unit may be further configured to output the first bone information image or the second bone information image to a user.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1-A and FIG. 1-B are schematic diagrams illustrating exemplary CT systems according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by other expression if they achieve the same purpose.

Figure 2:
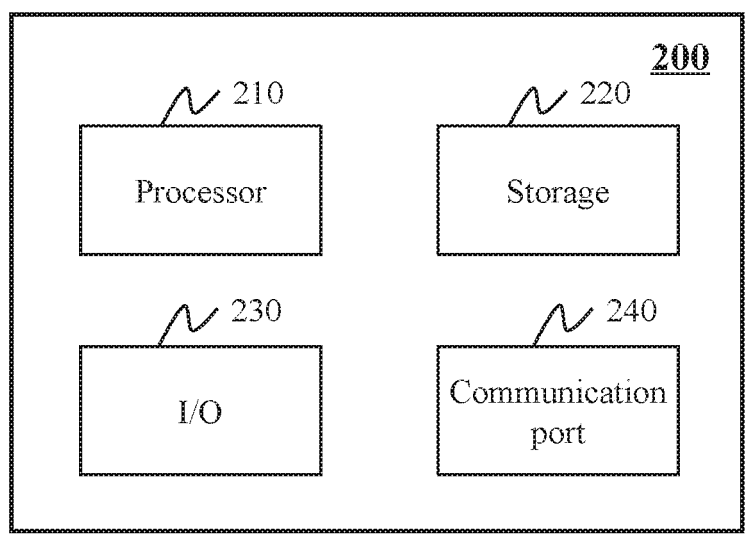
FIG. 2 is a schematic diagram illustrating an architecture of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for non-invasive imaging, such as for disease diagnosis or research purposes. In some embodiments, the imaging system may be a computed tomography (CT) system, an emission computed tomography (ECT) system, a magnetic resonance imaging (MRI) system, an ultrasonography system, an X-ray photography system, a positron emission tomography (PET) system, or the like, or any combination thereof.

The following description is provided to help better understanding CT image reconstruction methods or systems. The term "image" used in this disclosure may refer to a 2D image, a 3D image, a 4D image, or any related image data (e.g., CT data, projection data corresponding to the CT data). This is not intended to limit the scope the present disclosure. For persons having ordinary skills in the art, a certain amount of variations, changes, and/or modifications may be deducted under guidance of the present disclosure. Those variations, changes, and/or modifications do not depart from the scope of the present disclosure.

An aspect of the present disclosure relates to systems and methods for generating and correcting different CT images based on a raw data set. According to the present disclosure, a set of reference images may be generated, and bone information images of different thicknesses and/or image increments may be generated based on the set of reference images. Another aspect of the present disclosure relates to systems and methods for identifying abnormalities of CT systems. According to the present disclosure, abnormalities of a CT system may be identified by determining difference between reference images generated from different raw data sets.

FIG. 1-A and FIG. 1-B are schematic diagram illustrating an exemplary CT system according to some embodiments of the present disclosure. The CT system may include a CT scanner 110, a network 120, a terminal 130, a processing engine 140, and a storage 150. The connection between the components in the CT system 100 may be variable. Merely by way of example, as illustrated in FIG. 1-A, the CT scanner 110 may be connected to the processing engine 140 through the network 120. As another example, as illustrated in FIG. 1-B, the CT scanner 110 may be connected to the processing engine 140 directly.

The CT scanner 110 may include a gantry 111, a detector 112, a detecting region 113, a subject table 114, and a radioactive scanning source 115. The gantry 111 may support the detector 112 and the radioactive scanning source 115. A subject may be placed on the subject table 114 to be scanned. The radioactive scanning source 115 may emit radioactive rays to the subject. The detector 112 may detect radiation events (e.g., gamma photons) emitted from the detecting region 113. In some embodiments, the detector 112 may include a plurality of detector units. The detector units may include a scintillation detector (e.g., a cesium iodide detector) or a gas detector. The detector unit may be a single-row detector or a multi-rows detector.

The network 120 may facilitate exchange of information and/or data. In some embodiments, one or more components in the CT system 100 (e.g., the CT scanner 110, the terminal 130, the processing engine 140, or the storage 150) may send information and/or data to other component(s) in the CT system 100 via the network 120. For example, the processing engine 140 may obtain image data from the CT scanner 110 via the network 120. As another example, the processing engine 140 may obtain user instructions from the terminal 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points through which one or more components of the CT system 100 may be connected to the network 120 to exchange data and/or information.

The terminal 130 include a mobile device 130-1, a tablet computer 130-2, a laptop computer 130-3, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, the terminal 130 may be part of the processing engine 140. In some embodiments, the terminal 130 may be connected to or otherwise communicate with the processing engine 140.

The processing engine 140 may process data and/or information obtained from the CT scanner 110, the terminal 130, or the storage 150. In some embodiments, the processing engine 140 may be a single server, or a server group. The server group may be centralized, or distributed. In some embodiments, the processing engine 140 may be local or remote. For example, the processing engine 140 may access information and/or data stored in the CT scanner 110, the terminal 130, and/or the storage 150 via the network 120. As another example, the processing engine 140 may be directly connected to the CT scanner 110, the terminal 130 and/or the storage 150 to access stored information and/or data. In some embodiments, the processing engine 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing engine 140 may be implemented on a computing device 200 having one or more components illustrated in FIG. 2 in the present disclosure.

The storage 150 may store data and/or instructions. In some embodiments, the storage 150 may store data obtained from the terminal 130 and/or the processing engine 140. In some embodiments, the storage 150 may store data and/or instructions that the processing engine 140 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components in the CT system 100 (e.g., the processing engine 140, the terminal 130). One or more components in the CT system 100 may access the data or instructions stored in the storage 150 via the network 120. In some embodiments, the storage 150 may be directly connected to or communicate with one or more components in the CT system 100 (e.g., the processing engine 140, the terminal 130). In some embodiments, the storage 150 may be part of the processing engine 140.

FIG. 2 is a schematic diagram illustrating exemplary hardware and/or software components of an exemplary computing device 200 on which the processing engine 140 may be implemented according to some embodiments of the present disclosure. As illustrated in FIG. 2-A, the computing device 200 may include a processor 210, a storage 220, an input/output (I/O) 230, and a communication port 240.

The processor 210 may execute computer instructions (program code) and perform functions of the processing engine 140 in accordance with techniques described herein. The computer instructions may include routines, programs, objects, components, data structures, procedures, modules, and functions, which perform particular functions described herein. For example, the processor 210 may process image data obtained from the CT scanner 110, the terminal 130, the storage 150, or any other component of the CT system 100. In some embodiments, the processor 210 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be note that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., a first processor executes step A and a second processor executes step B, or the first and second processors jointly execute steps A and B).

The storage 220 may store data/information obtained from the CT scanner 110, the terminal 130, the storage 150, or any other component of the CT system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure.

The I/O 230 may input or output signals, data, or information. In some embodiments, the I/O 230 may enable a user interaction with the processing engine 140. In some embodiments, the I/O 230 may include an input device and an output device. Exemplary input device may include a keyboard, a mouse, a touch screen, a microphone, or the like, or a combination thereof. Exemplary output device may include a display device, a loudspeaker, a printer, a projector, or the like, or a combination thereof. Exemplary display device may include a liquid crystal display (LCD), a light-emitting diode (LED)-based display, a flat panel display, a curved screen, a television device, a cathode ray tube (CRT), or the like, or a combination thereof.

The communication port 240 may be connected to a network (e.g., the network 120) to facilitate data communications. The communication port 240 may establish connections between the processing engine 140 and the CT scanner 110, the terminal 130, or the storage 150. The connection may be a wired connection, a wireless connection, or combination of both that enables data transmission and reception. The wired connection may include electrical cable, optical cable, telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
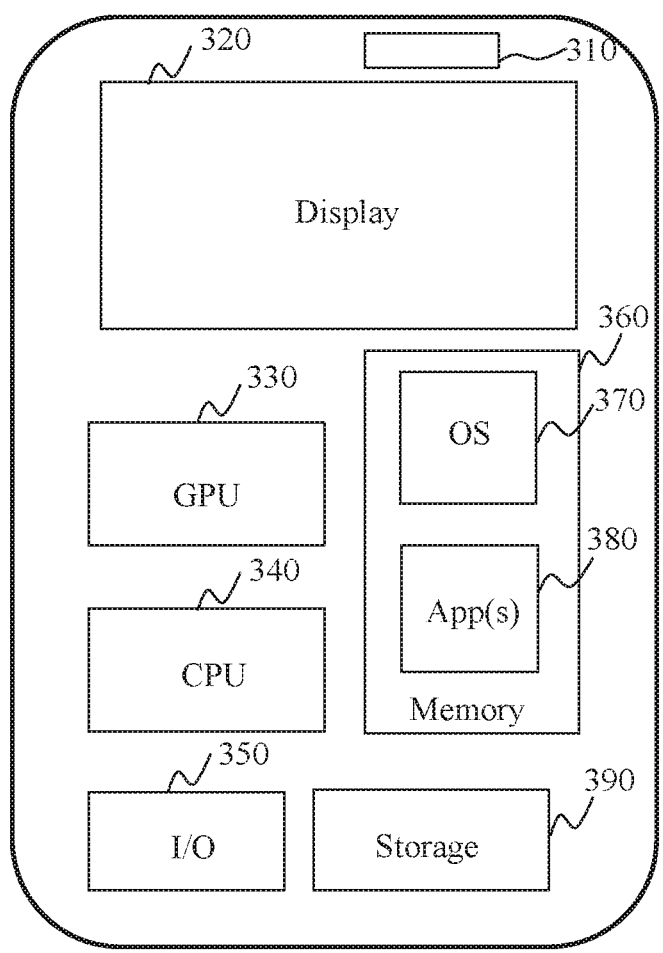
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 140. User interactions with the information stream may be achieved via the I/O 350 and provided to the processing engine 140 and/or other components of the CT system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to the blood pressure monitoring as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 4:
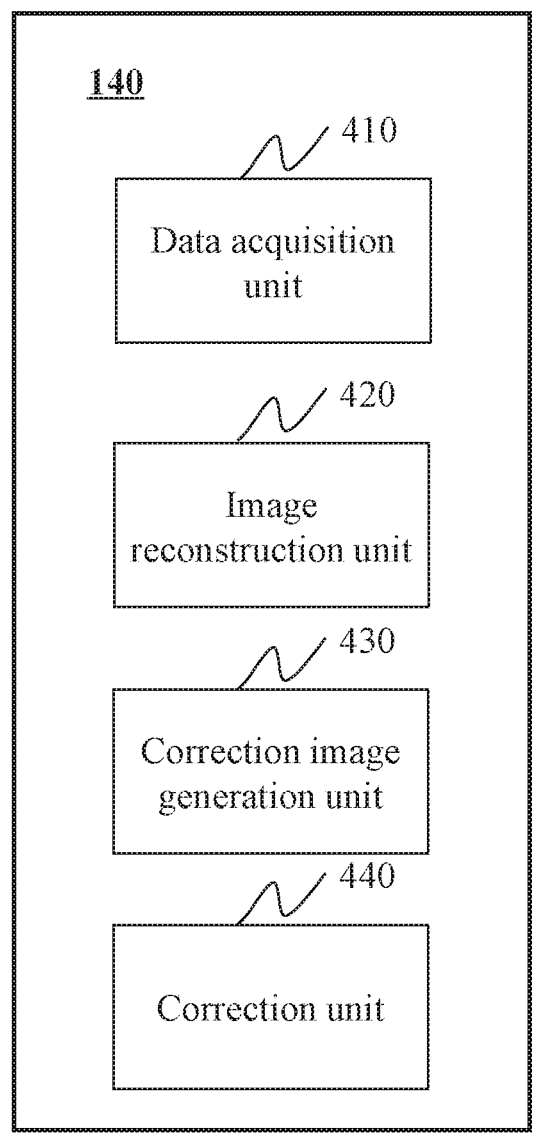
FIG. 4 is a schematic diagram illustrating an exemplary processor according to some embodiments of the present disclosure.

FIG. 4 is a schematic diagram illustrating an exemplary processing engine 140 according to some embodiments of the present disclosure. Processing engine 140 may process data obtained from or via CT scanner 110, processor 210, storage 220, input/output (I/O) 230, communication port 240, or the like, or any combination thereof. The data processed by processing engine 140 may include back projection data, forward projection data, correction data, filtered data, image data (e.g., original image data), or the like, or any combination thereof. Processing engine 140 may perform operations including, for example, data preprocessing, image reconstruction, image correction, image composition, lookup table creation, or the like, or any combination thereof. Processing engine 140 may include a data acquisition unit 410, an image reconstruction unit 420, a correction image generation unit 430, and a correction unit 440. Processing engine 140, or a portion thereof, may be implemented on the computing device 200 as illustrated in FIG. 2, or the mobile device as illustrated in FIG. 3.

Data acquisition unit 410 may obtain a raw data set related to an object under examination. The raw data set may include a plurality of raw data related to the object under examination. The data acquisition unit 410 may obtain the raw data set or the raw data via the detector 112 or the storage 150. The term "raw data" may refer to the data that may be detected by the detector 112, and the raw data may be utilized to construct a CT image. The raw data may be generated by traversing X-rays through an object under examination. The object may include a substance, a tissue, an organ, a specimen, a body, or the like, or any combination thereof. In some embodiments, the object may include a patient or a part thereof. The objet may include a head, a breast, a lung, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof.

Image reconstruction unit 420 may generate a CT image set based on the raw data set obtained from data acquisition unit 410. The CT image set may include one or more CT images. The CT image may be generated based on a reconstruction algorithm. The reconstruction algorithm may include a Fourier slice theorem algorithm, a filtered back projection (FBP) algorithm, a fan-beam reconstruction algorithm, an iterative reconstruction algorithm, an analytic reconstruction algorithm, an algorithm based on compressed sensing (CS), or the like, or any combination thereof.

A CT image may be a representation of a cross section of tissue of an object (e.g., a CT image slice (or referred to as a slice for brevity) of the object) under examination having some thickness. A CT image may include one or more pixels arranged in a reconstruction matrix. The size of the reconstruction matrix may determine number of pixels in a CT image. A pixel value may refer to the value of a property of the pixel. For instance, a pixel value may refer to luminance value of a pixel, grey value of a pixel, color or RGB value of a pixel, saturation value of a pixel, or the like, or any combination thereof. In a CT image, the pixel value may represent density of tissue. With different pixel values in the CT image, the CT image may represent structure of the slice of an object under examination.

In some embodiments, the image reconstruction unit 420 may generate different CT images with different reconstruction parameters. The reconstruction parameter may include field of view (FOV), image thickness, image increment, kernel, or the like, or any combination thereof. Thickness of a slice of an object may be referred as slice thickness. The position of the slice of an object may be referred as slice position. Image thickness may refer to nominal width of reconstructed image along z axis. The z axis may be parallel to moving direction of the subject table 114. The image thickness may be determined based on the slice thickness. In some embodiments, the image thickness of a CT image may be equal to or less than the slice thickness. The larger image thickness is, the higher resolution of the reconstructed image is. For a slice of the object under examination, at a certain slice position with a certain slice thickness, one or more CT images may be reconstructed to represent the slice. An image increment may refer to a distance between two consecutive CT images in terms of their slice positions in a CT image set including a stack of CT image slices. A field of view (FOV) may have the diameter of a CT image. The use of a small FOV may allow increased spatial resolution in a CT image, because the whole reconstruction matrix of the CT image may be used for reconstructing a smaller region than is the case with a larger FOV. CT images in a CT image set may be reconstructed based on the same reconstruction parameter(s). Accordingly, the reconstruction parameter(s) of the CT image set may be considered as the reconstruction parameter(s) of the CT images in the CT image set.

The correction image generation unit 430 may generate bone information (bone information) image set based on the CT image generated by the image reconstruction unit 420. The bone information image set may include one or more bone information images. The bone information image may include beam hardening artifact of a CT image. Beam hardening artifact may be observed in a CT image when a polychromatic X-ray beam passes through an object where the lower energy photons are absorbed leaving only the higher energy photons passing through the object and detected. The bone information image may correct the beam hardening artifact in the CT image. In some embodiments, the bone information image may be generated based on the same reconstruction parameter(s) of the CT image generated by the image reconstruction unit 420. For example, if the image reconstruction unit 420 reconstruct a CT image with an image thickness A and image increment B, a bone information image may also have the image thickness A and image increment B. In some embodiments, the bone information image may be generated based on a reference image. The reference image may refer to a bone information image reconstructed with a small image thickness and/or image increment. In some embodiments, the image thickness and/or image increment of the bone information image may be greater than the image thickness and/or image increment of the reference image. In some embodiments, the image thickness and/or image increment of the bone information image may be an integral multiple of image thickness and/or image increment of the reference image. In some embodiments, the reference image may be reconstructed with the smallest image thickness and/or the smallest image increment that the CT system 100 may achieve. Some of the reconstruction parameters of the bone information image and the reference image may be the same, such as FOV, kernel, etc., and some may be different, such as image thickness and image increment. The bone information image for a certain slice position may be generated by stacking a certain number of consecutive reference images that correspond to a same or similar portion of the object compared to the to the bone information image or the CT image slice of that slice position. For example, for a bone information image of a slice having an image thickness of 20 mm and image increment of 20 mm, and the reference image of the slice having an image thickness of 10 mm and image increment of 10 mm, two reference images of the slice may be stacked to generate the bone information image.

The hardening beam artifact may have two distinct appearances, streaks or dark bands in a CT image, and cupping artifact in a CT image. Such artifact in the CT image may be misinterpreted by a user (e.g., a doctor) as a feature of some disease. For example, hardening beam artifact with appearance of dark bands in a CT image may be misinterpreted as a feature of a tumor. Since bone information image may have characteristic of the hardening beam artifact, a bone information set may be used by a user (e.g., a doctor) to distinguish the hardening beam artifact from a feature of some disease. The bone information image set may be presented in the form of a bone information image set or a bone information image. In some embodiments, the correction image generation unit 430 may output a bone information image set or a bone information image to a user (e.g., a doctor) via the I/O 230.

In some embodiments, the correction unit 440 may determine the working status of the CT system 100 when performing scans of a first object and a second object based on the similarity between a first reference image set and a second reference image set relating to the two objects. Different bone information image sets may be generated based on different raw data sets obtained by scanning the two different objects. Normally, a first bone information image set of the first object may be similar to a second bone information image set of the second object, considering that a bone information image set represent hardening beam artifact caused by hard tissue, and the proportion of hard tissue relative to soft tissue may be similar between different objects (e.g., different patients under examination). If the first bone information set is different from the second bone information set (e.g., the similarity of the first bone information set and the second bone information set is under a threshold), the working status of the CT system 100 may be considered to have changed between the scanning of the first object and the scanning of the second object. The correction unit 440 may identify abnormalities of the CT system 100 based on whether the working status of the CT system 100 has changed. In some embodiments, the working status of the CT system 100 may include the working status of the detector 112 (e.g., whether the detector 112 may work at a predetermined temperature) and the working status of the radioactive scanning source 115 (e.g., whether the radioactive scanning source 115 may emit a predetermined amount of X-ray).

The correction unit 440 may be configured to correct the CT image generated by the image reconstruction unit 420. The correction unit 440 may remove hard tissue in the CT image generated in the image reconstruction unit 420 to generate a hard tissue corrected image. The hard tissue corrected image may include removed or reduced hard tissue. The correction unit 440 may correct hardening beam artifact in the CT image generated by the image reconstruction unit 420 to generate a beam hardening artifact corrected image. The beam hardening artifact corrected image may include removed or reduced beam hardening artifact. The correction may be performed by changing the pixel value of a pixel in the CT image. For example, to remove hard tissue in a CT image, correction unit 440 may change the pixel value of a pixel whose pixel value exceeds a threshold. As another example, to correct hardening beam artifact in a CT image, correction unit 440 may change the pixel value of a pixel based on the bone information image.

Figure 5:
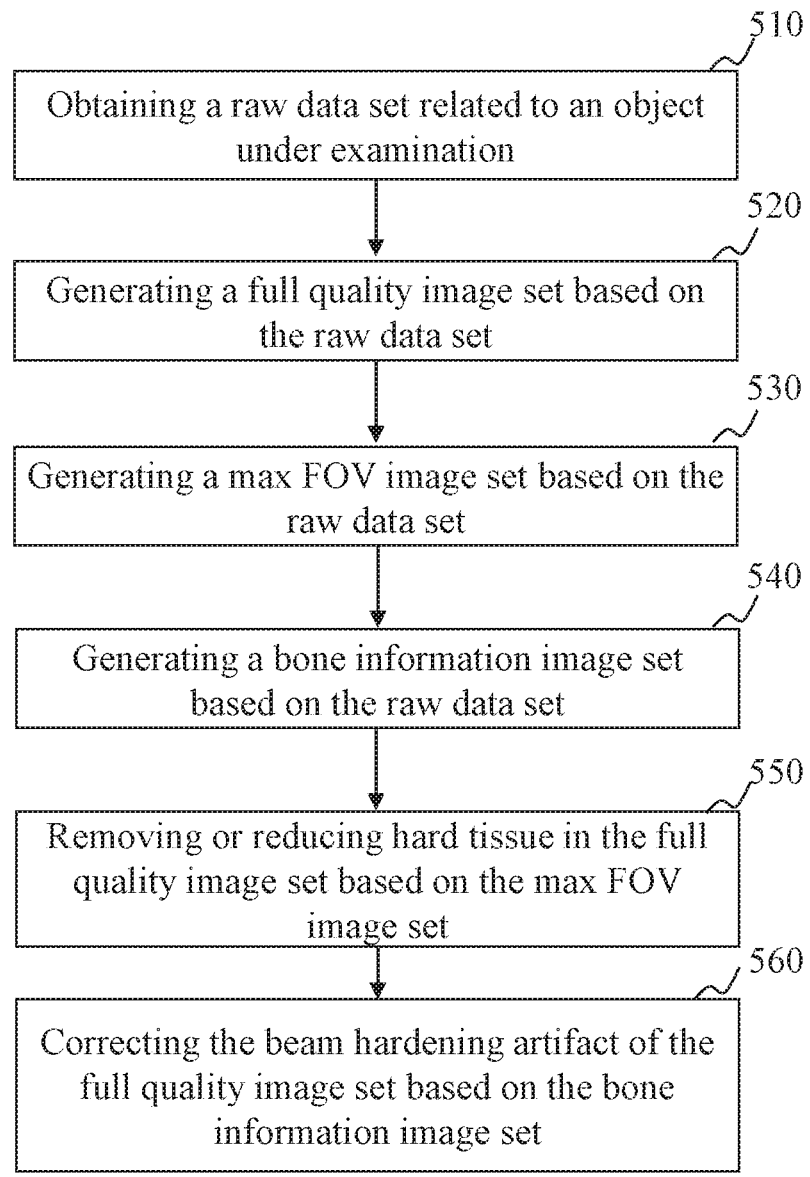
FIG. 5 is a flowchart of an exemplary process for generating a full quality image set with hard tissue removed and hardening beam artifact corrected according to some embodiments of the present disclosure.

FIG. 5 is a flowchart of an exemplary process for generating a full quality image set according to some embodiments of the present disclosure. In some embodiments, one or more operations of process illustrated in FIG. 5 for generating a full quality image set may be implemented in the CT system 100 illustrated in FIG. 1. For example, the process illustrated in FIG. 5 may be stored in the storage 150 in the form of instructions, and invoked and/or executed by the processing engine 140 (e.g., the processor 210 of the computing device 200 as illustrated in FIG. 2, the CPU 340 of the mobile device 300 as illustrated in FIG. 3).

In 510, the data acquisition 410 may obtain a raw data set related to an object under examination. The raw data set may include a plurality of raw data related to the object under examination. The data acquisition 410 may obtain the raw data set via the CT scanner 110 or the storage 150. The raw data set may be generated by emitting X-rays toward the object under examination.

In 520, the image reconstruction unit 420 may generate a full quality image set based on the raw data set. The full quality image set may include one or more full quality images. The term "full quality image" may refer to a CT image with a small FOV (e.g., 10 cm). Details of soft tissue may be observed in a full quality image. As used herein, soft tissue may refer to a tissue that connects, supports, or surrounds another structure and/or organ of the body, not being hard tissue such as bone. In some embodiments, the soft tissue may include tendons, ligaments, fascia, skin, fibrous tissues, fat, and synovial membranes (which are connective tissue), muscles, nerves and blood vessels (which are not connective tissue), or the like, or any combination thereof. The hard tissue may refer to a tissue that is mineralized and has a firm intercellular matrix. In some embodiments, the hard tissue may include bone, tooth enamel, dentin, and cementum, or the like, or any combination thereof.

In some embodiments, the reconstruction of the full quality image images may be based on techniques including Fourier slice theorem, filtered back projection algorithm, fan-beam reconstruction, iterative reconstruction, etc. The image reconstruction unit 420 may reconstruct the full quality image based on a set of reconstruction parameters, such as a field of view (FOV), image thickness, image increment, kernel, or the like, or any combination thereof.

In 530, the image reconstruction unit 420 may generate a max FOV image set based on the raw data set. The max FOV image set may include one or more max FOV images. The term "max FOV image" may refer to a CT image with a large FOV (e.g., 30 cm) larger than the FOV of a corresponding full quality image obtained based on the same raw data set. The boundary between soft tissue and hard tissue may be observed in the max FOV image.

In some embodiments, the reconstruction of the max FOV image may be based on techniques including Fourier slice theorem, filtered back projection algorithm, fan-beam reconstruction, iterative reconstruction, etc. The image reconstruction unit 420 may reconstruct a max FOV image based on a set of reconstruction parameter, such as a field of view (FOV), image thickness, image increment, kernel, or the like, or any combination thereof. In some embodiments, the FOV of a max FOV image may be larger than that of a full quality image, and the spatial resolution of the full quality image may be higher than that of the max FOV image. In some embodiments, image increment and/or image thickness of the max FOV image set and the full quality image set may be the same.

In 540, the correction image generation unit 430 may generate a bone information image set based on the max FOV image set. The bone information image set may include one or more bone-info images. The term "bone information image" may refer to an image for correcting hardening beam artifact caused by the hard tissue. The bone information image may represent hardening beam artifact of a CT image. The hardening beam artifact may have two distinct appearances, streaks or dark bands in a CT image, or cupping artifact in a CT image. Pixels of the bone information image may represent at least one of these appearances.

In some embodiments, a bone information image set may be generated based on a reference image set. The reference image set may include at least one reference image. The term "reference image" may refer to a bone information image constructed with a small image thickness and/or image increment, while other reconstruction parameters (e.g., FOV, kernel, etc.) of the reference image are the same as those of the bone information image. In some embodiments, the image thickness and/or image increment of the bone information image may be greater than the image thickness and/or image increment of the reference image. In some embodiments, the image thickness of the bone information image may be an integral multiple of the image thickness of the reference image. In some embodiments, the image increment of the bone information image may be an integral multiple of image increment of the reference image. In some embodiments, the reference image may be reconstructed with the smallest image thickness and/or smallest image increment that the CT system 100 may achieve. The bone information image for a certain slice may be generated by stacking a certain number of consecutive reference images that correspond to a same or similar portion of the object compared to the bone information image or the CT image slice of the slice position. For example, for a bone information image of a slice having an image thickness of 20 mm and image increment of 20 mm, and the reference image of the slice having an image thickness of 10 mm and image increment of 10 mm, two reference images may be stacked to generated a bone information image. In some embodiments, the bone information image(s) may be used correct the hardening beam artifact in the full quality image. The bone information image set may be generated in advance and stored in the storage 150. The correction image generation unit 430 may generate the bone information image based on the reference image via accessing the storage 150. Detailed description of reference image generation may be found in FIG. 6 and the description thereof.

In 550, the correction unit 440 may remove or reduce the hard tissue in the full quality image based on the max FOV image set to generate a hard tissue corrected image. The hard tissue corrected image may include removed or reduced hard tissue. Considering that an FOV of the full quality image may be smaller than that of the max FOV image, the integrity of the hard tissue in the max FOV image may be better than in the full quality image set. For example, in a CT image slice corresponding to the head of the object under examination, a full quality image related to the slice may display a part of the skull of the object under examination, while a max FOV image related to the slice may display the whole skull. The correction unit 440 may extract shape characteristics (e.g., a profile curve of the hard tissue) of the hard tissue in the max FOV image, and remove the hard tissue in the full quality image based on the shape characteristics of the hard tissue in the full quality image.

In some embodiments, the correction image generation unit 430 may output the bone information image set or the bone information image to a user (e.g., a doctor) via the I/O 230, on the basis of which the user may distinguish the hardening beam artifact and a feature of some disease. In some embodiments, the correction image generation unit 430 may forward the bone information image set of the bone information image to a storage device (e.g., storage 150, etc.) for future use.

In 560, the correction unit 440 may correct the beam hardening artifact of the full image set based on the bone information image set to generate a beam hardening artifact corrected image. The beam hardening artifact corrected image may include removed or reduced beam hardening artifact. The bone information image may be used to correct beam hardening artifact by changing pixel value of pixels in the full quality image which represent the beam hardening artifact. Pixel in the full quality image may have a corresponding pixel in the bone information image representing same position in the slice. The correction unit 440 may change the pixel value of a pixel in the max FOV image based on the pixel value of the corresponding pixel in the bone information image.

Figure 6:
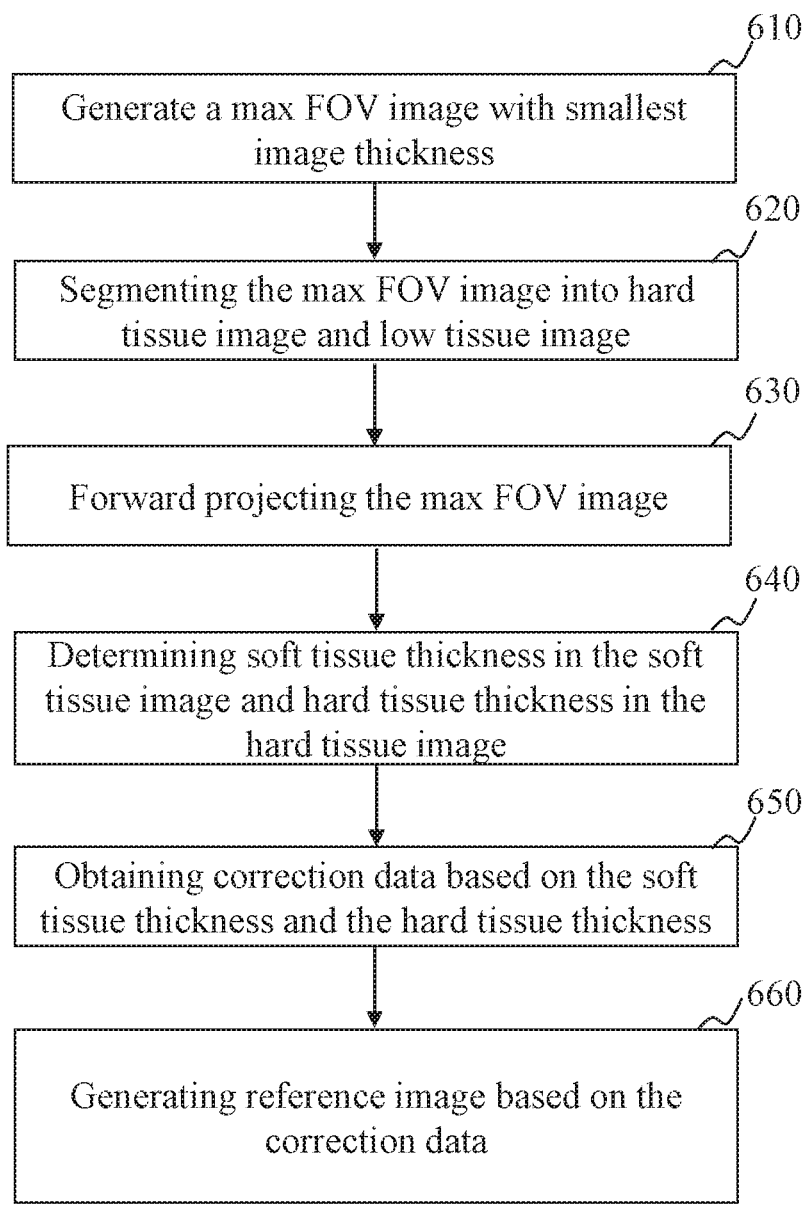
FIG. 6 is a flowchart of an exemplary process for generating a reference image according to some embodiments of the present disclosure.

FIG. 6 is a flowchart of an exemplary process for generating a reference image according to some embodiments of the present disclosure. In some embodiments, one or more operations of process illustrated in FIG. 6 for generating a full quality image set may be implemented in the CT system 100 illustrated in FIG. 1. For example, the process illustrated in FIG. 6 may be stored in the storage 150 in the form of instructions, and invoked and/or executed by the processing engine 140 (e.g., the processor 210 of the computing device 200 as illustrated in FIG. 2, the CPU 340 of the mobile device 300 as illustrated in FIG. 3).

In 610, the image reconstruction unit 420 may generate a max FOV image. The operation 610 may be performed according to the relevant portion of the process illustrated in FIG. 5 and the description thereof.

In 620, the correction image generation unit 430 may segment the max FOV image into hard tissue image and soft tissue image. The correction image generation unit 430 may segment the max FOV image by assigning the pixels whose pixel values exceed a threshold to the hard tissue image, and assigning the pixels whose pixel values are below the threshold to the soft tissue image.

In 630, the correction image generation unit 430 may forward project the hard tissue image and the soft tissue image. By the forward projection, the hard tissue image and the soft tissue image may be transformed from an image domain into a projection domain. The correction image generation unit 430 may obtain projection data related to the hard tissue image and projection data related to the soft tissue image in the projection domain.

In 640, the correction image generation unit 430 may determining the soft tissue thickness in the soft tissue image and hard tissue thickness in the hard tissue image based on the projection data related to the hard tissue image and the projection data related to the soft tissue image. In some embodiments, correction image generation unit 430 may determine the thickness of the soft tissue in the soft tissue image and thickness of the hard tissue in the hard tissue image based on the assumption that the object under examination include only a slab of hard tissue and a slab of soft tissue. An X-ray beam may enter into the slab of hard tissue of thickness $X_B$ and after passing through the slab of hard tissue may enter into the slab of soft tissue of thickness $X_T$, and then the X-ray beam may be detected by the detector 112 after it exits the soft tissue. It should be noted that even if the hard tissue and the soft tissue along the beam path may distribute differently, for the purposes of determining the hard tissue thickness and the soft tissue thickness, the assumption essentially does not change the forward projection data obtained in 630.

In 650, the correction image generation unit 430 may obtain correction data based on the soft tissue thickness and the hard tissue thickness. With a known soft tissue thickness (e.g., $X_T$) and a known hard tissue thickness (e.g., $X_B$), correction image generation unit 430 may obtain correction data based a correction table. In some embodiments, the correction table may be generated in advance and stored the storage 150. The correction table may include correction data due to the hardening beam artifact for the conversion of polychromatic projection data that are impacted by the hardening beam effect (e.g., forward projection data obtained in 630), into monochromatic projection data. The correction image generation unit 430 may obtain a CT image (e.g., a reference image) containing only the hardening beam artifact with reconstructing the correction data. In some embodiments, the correction image generation unit 430 may perform interpolation or extrapolation based on values available in the correct table if correction data corresponding to the soft tissue thickness $X_T$ and the hard tissue thickness $X_B$ do not exist in the correction table. For example, for a soft tissue thickness of 20 mm, the correction table only have correction data A for a soft tissue thickness of 22 mm and correction data B for a soft tissue thickness of 18 mm, the correction unit 440 may determine an average of the correction data A and correction data B as the correction data for the soft tissue thickness of 22 mm.

In 660, the correction image generation unit 430 may generate a reference image based on the correction data. With the construction process, the correction image generation unit 430 may transform the correction data from the projection data domain to the image domain. The reconstruction of the reference image may be based on techniques including Fourier slice theorem, filtered back projection algorithm, fan-beam reconstruction, iterative reconstruction, etc. The correction image generation unit 430 may reconstruct the reference image based on a set of reconstruction parameters including, for example, field of view (FOV), image thickness, image increment, kernel, or the like or any combination thereof. In some embodiments, the reference image may be reconstructed based on the smallest image thickness and/or smallest image increment that the CT system 100 may achieve.

Figure 7:
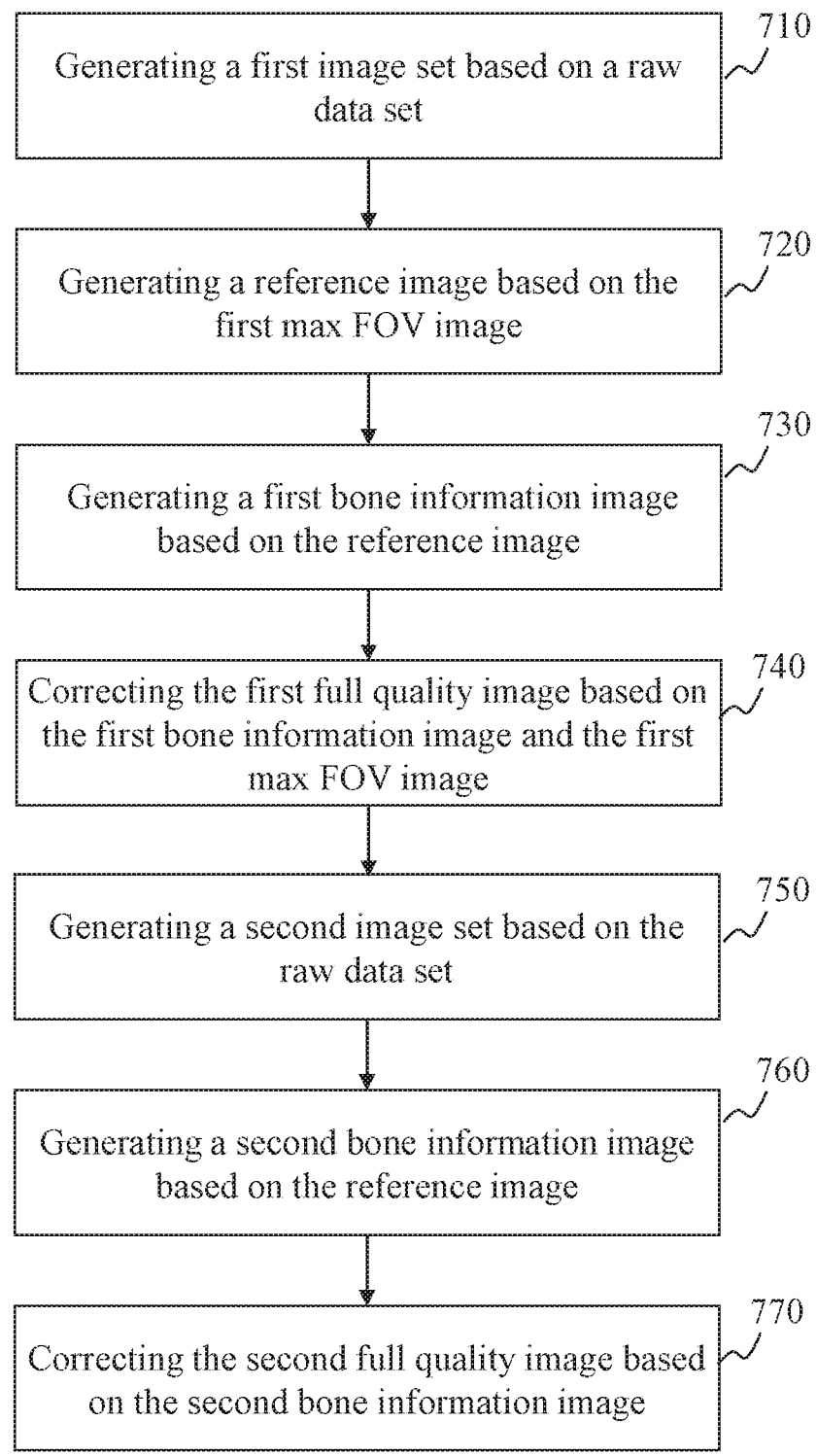
FIG. 7 is a flowchart of an exemplary process for hard tissue removing and hardening beam artifact correcting process according to some embodiments of the present disclosure.

FIG. 7 is a flowchart of an exemplary process for removing hard tissue and/or correcting hardening beam artifact according to some embodiments of the present disclosure. For diagnosis purposes, different full quality images reconstructed with different reconstruction parameters may be generated. In some embodiments, one or more operations of process illustrated in FIG. 7 for generating a full quality image set may be implemented in the CT system 100 illustrated in FIG. 1. For example, the process illustrated in FIG. 7 may be stored in the storage 150 in the form of instructions, and invoked and/or executed by the processing engine 140 (e.g., the processor 210 of the computing device 200 as illustrated in FIG. 2, the CPU 340 of the mobile device 300 as illustrated in FIG. 3). The user (e.g., a doctor), to determine a feature of some disease, may need a first full quality image reconstructed with a first image increment and/or a first image thickness, and a second full quality image reconstructed with a second images increment and/or a second image thickness. Both the first full quality image and the second full quality image may need to be processed to remove the hard tissue and/or correct the hardening beam artifact. The correction image generation unit 430 may generate different bone information images reconstructed with different reconstruction parameters based on the same reference image.

In 710, the image reconstruction unit 420 may generate a first image set based on a raw data set. The first image set may include a first full quality image and a first max FOV image. The first full quality image may be generated based on reconstruction parameters including FOV A1, image thickness A2, and image increment A3. The first max FOV image may be generated based on reconstruction parameters including FOV B1, image thickness A2, and image increment A3. In some embodiments, the FOV A1 may be smaller than FOV B1. Operation of 710 may be performed according to the relevant portion (e.g., operation 520, operation 530, etc.) of the process illustrated in FIG. 5 and the description thereof.

In 720, the correction image generation unit 430 may generate a reference image based on the first max FOV image. The reference image may be generated based on reconstruction parameters including FOV B1, image thickness M1, and image increment M2. In some embodiments, the value of A2 may be greater than the value of M1. In some embodiments, the value of A2 may be an integral multiple of the value of M1. In some embodiments, image thickness M1 may be the smallest image increment that the CT system 100 may achieve. In some embodiments, the value of A3 may be greater than the value of M2. The value of A3 may be an integral multiple of the value of M2. In some embodiments, the image increment M2 may be the smallest image increment that the CT system 100 may achieve. The operation 720 may be performed according to the relevant portion (e.g., operation 620, operation 630, operation 640, operation 650, operation 660, etc.) of the process illustrated in FIG. 6 and the description thereof.

In 730, the correction image generation unit 430 may generate a first bone information image based on the reference image. The correction image generation unit 430 may reconstruct a first bone information image by stacking a certain number of reference images. The first bone information image may have reconstruction parameters including FOV B1, image thickness A2, and image increment A3. The operation 730 may be performed according to the relevant portion (e.g., operation 540, etc.) of the process illustrated in FIG. 5 and the description thereof.

In some embodiments, the correction image generation unit 430 may output the first bone information image to a user (e.g., a doctor) via the I/O 230 on the basis of which the user may distinguish the hardening beam artifact and a feature of some disease.

In 740, the correction unit 440 may correct the first full quality image based on the first bone information image and the first max FOV image. The correction unit 440 may correct the hardening beam artifact of the first full quality image based the first bone information image to generate a beam hardening artifact corrected image. The beam hardening artifact corrected image may include removed or reduced beam hardening artifact. In some embodiments, the correction unit 440 may remove hard tissue of the first full quality image based on the first max FOV image to generate a hard tissue corrected image. The hard tissue corrected image may include removed or reduced hard tissue. The operation 740 may be performed according to the relevant portion (e.g., operation 550, etc.) of the process illustrated in FIG. 5 and the description thereof.

In 750, the image reconstruction unit 420 may generating a second image set based on the raw data set. The raw data set used in 730 may be same as the raw data used in 710. The second image set may include a second full quality image. The second full quality image may have reconstruction parameters including FOV A1 (which is same as FOV of first full quality image), image thickness C2, image increment C3. Operation of 750 may be performed according to the relevant portion (e.g., operation 520, operation 530, etc.) of the process illustrated in FIG. 5 and the description thereof.

In 760, the correction image generation unit 430 may generate a second bone information image based on the reference image. The correction unit 440 may reconstruct a second bone information image by stacking a certain number of reference images. The second bone information image may have reconstruction parameter including FOV B1, which is same as FOV of the first max FOV image and the first bone information image, image thickness C2, and image increment C3. In some embodiments, the image thickness C2 of the second bone information image may greater than the image thickness M1 of the reference image. In some embodiments, the image thickness C2 of the second bone information image may be an integral of the image thickness M1 of the reference image. In some embodiments, the image increment C3 of the second bone information image may be greater than the image increment M2 of the reference image. In some embodiments, the image increment C3 of the second bone information image may greater than the image increment M2 of the reference image. The image increment C3 of the second bone information image may be an integral of the image increment M2 of the reference image. Detailed description of step 760 may be found in FIG. 5 and the description thereof. The operation 760 may be performed according to the relevant portion (e.g., operation 540, etc.) of the process illustrated in FIG. 5 and the description thereof.

In some embodiments, the correction image generation unit 430 may output the second bone information image to a user (e.g., a doctor) via the I/O 230 to distinguish the hardening beam artifact and feature from a feature of some disease.

In 770, the correction unit 440 may correct the second full quality image based on the second bone information image. The correction unit 440 may correct the hardening beam artifact of the second full quality image based on the second bone information image to generate a beam hardening artifact corrected image. The beam hardening artifact corrected image may include removed or reduced beam hardening artifact. The operation 770 may be performed according to the relevant portion (e.g., operation 550, etc.) of the process illustrated in FIG. 5 and the description thereof.

Figure 8:
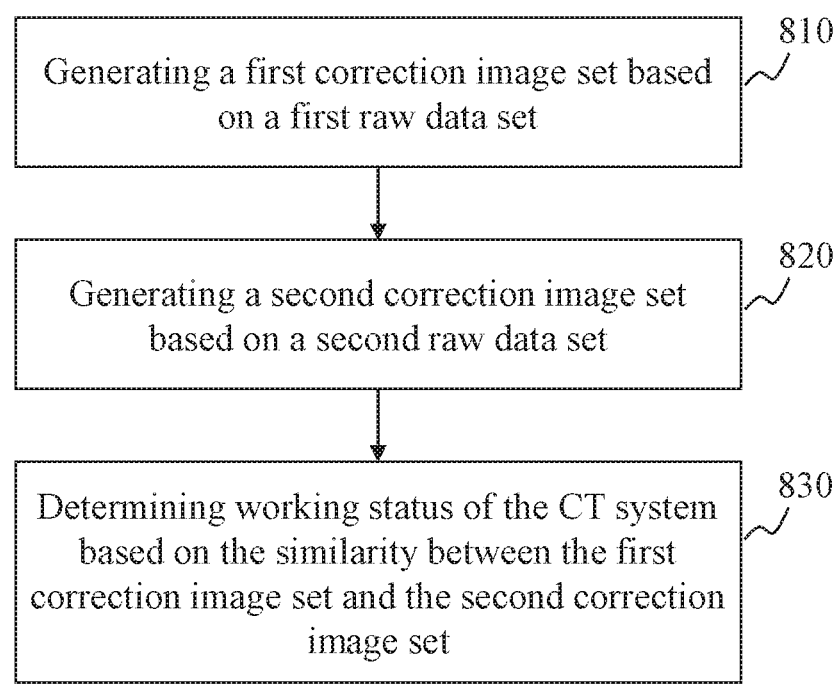
FIG. 8 is a flowchart of an exemplary process for checking working status based on the bone information image according to some embodiments of the present disclosure.

FIG. 8 is a flowchart of an exemplary process for checking the working status of CT system 100 based on the bone information image according to some embodiments of the present disclosure. Different bone information image sets may be generated based on different raw data sets obtained by scanning the two different objects. In some embodiments, one or more operations of process illustrated in FIG. 8 for generating a full quality image set may be implemented in the CT system 100 illustrated in FIG. 1. For example, the process illustrated in FIG. 8 may be stored in the storage 150 in the form of instructions, and invoked and/or executed by the processing engine 140 (e.g., the processor 210 of the computing device 200 as illustrated in FIG. 2, the CPU 340 of the mobile device 300 as illustrated in FIG. 3). Normally, a first bone information image set of a first object may be similar to a second bone information image set of a second object, since bone information image set represents hardening beam artifact caused by hard tissue, and the proportion of hard tissue and relative to soft tissue may be similar between different objects (e.g., different patients under examination). If the first bone information set is different from the second bone information set (e.g., the similarity of the first bone information set and the second bone information set is under a threshold), the working status of the CT system 100 may have changed, and the correction unit 440 may identify abnormalities of the CT system 100 based on whether the working status of the CT system 100 have changed. In some embodiments, the working status of the CT system 100 may include working status of the detector 112 (e.g., whether the detector 112 may work at a predetermined temperature, etc.) and the working status of the radioactive scanning source 115 (e.g., whether the radioactive scanning source 115 may emit predetermined amount of X-ray).

In 810, the correction unit 440 may generate a first reference image based on a first raw data set. The first raw data set may include a plurality of raw data related to a first object under examination. Detailed description of 810 may be found in FIG. 6 and the description thereof.

In 820, the correction unit 440 may generate a second reference image based on a second raw data set. The second raw data set may include a plurality of raw data related to a second object under examination. Detailed description of step 820 may be found in FIG. 6 and the description thereof.

In 830, the correction unit 440 may determine the working status of the CT system 100 based on the similarity between the first reference image and the second reference image. If the similarity between the first reference image and the second reference image exceeds a threshold, the working status of the CT system 100 when scan the first object may be different from the working status of the CT system 100 when scan the second object, and the. The correction unit 440 may identify abnormalities of the CT system 100 based on difference between the working status of the CT system 100 when scan the first object and the working status of the CT system 100 when scan the second object. If the similarity between the first reference image and the second reference image do not exceed a threshold, working status of the CT system 100 when scan the first object may be the same with the working status of the CT system 100 when scan the second object.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A method, for CT image reconstruction, implemented on a computing device having at least one processor, at least one computer-readable storage medium, the method comprising:
   obtaining a raw data set related to an object;
   generating a set of full quality images with a target image thickness based on the raw data set;
   generating a set of original bone information images with an original image thickness based on the raw data set;
   generating a set of target bone information images with a target image thickness based on the set of original bone information images, the target image thickness being different from the original image thickness; and
   correcting hardening beam artifact of the full quality images based on the set of target bone information images to generate a set of hardening beam artifact corrected images.

2. The method of claim 1, wherein the target image thickness is greater than the original image thickness.

3. The method of claim 1, wherein a target image increment of a target bone information image of the set of target bone information images is greater than an original image increment of an original bone information image of the set of original bone information images.

4. The method of claim 1, wherein the generating a set of original bone information images comprising:
   generating a set of max field of view images based on the raw data set; and
   generating the set of original bone information images based on the set of max field of view images.

5. The method of claim 4, wherein a field of view of a full quality image of the set of full quality images is smaller than a field of view of a max field of view image of the set of max field of view images.

6. The method of claim 1, further comprising:
   removing hard tissue from the set of full quality images based on the set of target bone information images to generate a set of hard tissue corrected images.

7. The method of claim 1, wherein the generating a target bone information image further comprises:
   stacking one or more original bone information images based on the original image thickness and the target image thickness.

8. The method of claim 1, wherein the generating a target bone information image further comprises:
   stacking one or more original bone information images based on an image increment of the original bone information image and an image increment of the target bone information image.

9. The method of claim 1, further comprising:
   outputting the set of target bone information images to a user.

10. A system for image reconstruction, comprising:
    a computer-readable storage medium storing a set of instructions for CT image reconstruction;
    a processor in communication with the computer-readable storage medium, wherein when executing the set of instructions, the system is directed to:
    obtain a raw data set related to an object;
    generate a set of full quality images with a target image thickness based on the raw data set;
    generate a set of original bone information images with an original image thickness based on the raw data set;
    generate a set of target bone information images with a target image thickness based on the set of original bone information images, the target image thickness being different from the original image thickness; and
    correct hardening beam artifact of the full quality images based on the set of target bone information images to generate a set of hardening beam artifact corrected images.

11. The system of claim 10, wherein the target image thickness is greater than the original image thickness.

12. The system of claim 10, wherein a target image increment of a target bone information image of the set of target bone information images is greater than an original image increment of an original bone information image of the set of original bone information images.

13. The system of claim 10, wherein to generate the set of original bone information images comprising, the system is further directed to:
    generate a set of max field of view images based on the raw data set; and
    generate the set of original bone information images based on the set of max field of view images.

14. The system of claim 13, wherein a field of view of a full quality image of the set of full quality images is smaller than a field of view of a max field of view image of the set of max field of view images.

15. The system of claim 10, wherein the system is further directed to:
    remove hard tissue from the set of full quality images based on the set of target bone information images to generate a set of hard tissue corrected images.

16. The system of claim 10, wherein to generate a target bone information image, the system is further configured to:
    stacking one or more original bone information images based on the original image thickness and the target image thickness.

17. The system of claim 10, wherein to generate a target bone information image, the system is further configured to:
    stack one or more original bone information images based on an image increment of the original bone information image and an image increment of the target bone information image.

18. The system of claim 10, wherein to generate a target bone information image, the system is further configured to:
    output the set of target bone information images to a user.

19. A non-transitory computer readable medium comprising executable instructions that, when executed by at least one processor, cause the at least one processor to effectuate a method comprising:
    obtaining a raw data set related to an object;
    generating a set of full quality images with a target image thickness based on the raw data set;
    generating a set of original bone information images with an original image thickness based on the raw data set;

generating a set of target bone information images with a target image thickness based on the set of original bone information images; and correcting hardening beam artifact of the full quality images based on the set of target bone information images to generate a set of hardening beam artifact corrected images.

20. The non-transitory computer readable medium of claim 19, wherein the target image thickness is greater than the original image thickness.

* * * * *